UNITED STATES PATENT OFFICE.

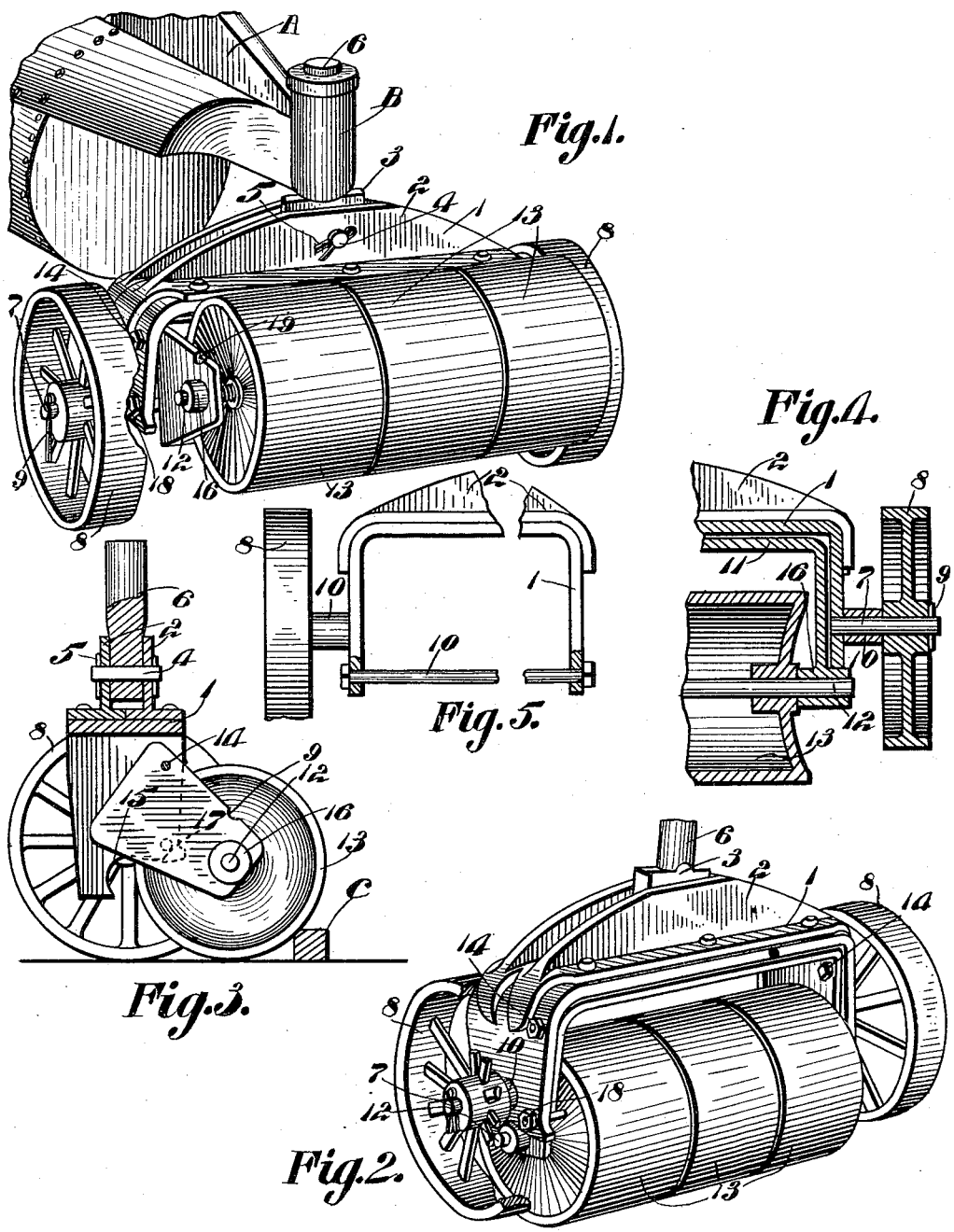

ALPHONSE BAECHLE, OF NORWALK, OHIO.

COMBINED ROLLER AND TRACTOR.

1,052,643.  Specification of Letters Patent.  Patented Feb. 11, 1913.

Application filed April 30, 1912. Serial No. 694,163.

*To all whom it may concern:*

Be it known that I, ALPHONSE BAECHLE, a citizen of the United States, residing at Norwalk, in the county of Huron and State of Ohio, have invented a new and useful Combined Roller and Tractor, of which the following is a specification.

This invention relates to a combined roller and tractor, and more particularly to means whereby a tractor can be quickly and easily converted into a roller and vice versa.

A further object is to provide a roller attachment for a tractor which can be held out of active position while the machine is passing over a surface not to be rolled.

Another object is to provide a roller attachment which, when in active position, supports the weight of the front portion of the machine.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a perspective view of a front portion of a tractor having the present improvements combined therewith. Fig. 2 is a perspective view of the attachment constituting the present invention, a portion of one of the supporting wheels being broken away. Fig. 3 is a vertical section through the attachment, the roller being shown lowered into contact with the ground and immediately prior to being shifted into active position. Fig. 4 is a vertical transverse section through one portion of the attachment with the roller in active position. Fig. 5 is a view partly in section and partly in front elevation of a portion of the attachment with the roller removed, a strain rod being shown in position within the attachment.

Referring to the figures by characters of reference A designates the front portion of a tractor of any standard type, the same being provided with a tubular head B. The attachment constituting the present invention includes a yoke 1 the top of which is provided with parallel upstanding flanges 2 having a block 3 therebetween and mounted to rock upon a pivot pin 4 which is held in the flanges by cotter pins 5 or the like. A stem 6 extends upwardly from the block 3 and within the head B. Thus it will be seen that the yoke 1 is free to swing about the longitudinal axis of the stem 6 and also to rock upon the pin 4. Stub axles 7 extend laterally from the sides of the yoke 1 and are engaged by supporting wheels 8 which may be retained thereon in any desired manner, as by means of cotter pins 9, there being spacing sleeves 10 upon the stub axles between the wheels 8 and the sides of the yoke 1.

When the tractor A is to be used solely as a tractor, the sides of the yoke 1 may be connected by a strain rod or brace 10 as shown in Fig. 5. When the attachment is to be used for rolling purposes, a supplemental yoke 11 is employed, this yoke having a shaft 12 secured thereon and on which the sections 13 of the roller are loosely journaled. The upper portions of the sides of the yoke 11 are detachably and pivotally connected to the sides of the yoke 1 by means of bolts 14 which can be removed readily when it is desired to detach the supplemental yoke 11 from the main yoke 1. The yoke 11 is preferably flat at the top and, when the roller sections 13 are in use, this flat top fits snugly upon the bottom face of the intermediate portion of yoke 1. The front lower corners of the sides of yoke 1 are rounded concentrically with the bolts 14 and terminate in notches 15. Bosses 16 extend laterally from the sides of the supplemental yoke 11 and are adapted to travel along the curved portions 17 of the yoke 1 and into the notches 15, the walls of the notches contacting with the bosses. When the supplemental yoke 11 is in position within the yoke 1 and with the bosses 16 seated in the notches 15, locking bolts 18 may be inserted through openings in the sides of yoke 1 so as to project into notches 19 formed in the front edges of the sides of yoke 11. With the parts thus arranged it will be seen that the shaft 12 will be disposed in vertical alinement with the axes of the wheels 8 and, as the roller sections 13 thus project below the wheels 8, it will be seen that the weight of the front portion of the tractor will be supported solely by the roller. Furthermore the supplemental yoke 11 is held positively against displacement relative to the yoke 1 for the reason that its flat intermediate portion bears upwardly against the intermediate portion of the yoke 1 while the holding bolt 18 prevents the yoke 11 from swinging forwardly out of place.

Should it be desired to shift the roller sections out of active positions while, for example traveling over a section which should not be rolled, the locking bolts 18 are removed and, by backing the tractor, the supplemental yoke 11 will be caused to swing out of the yoke 1 and the wheels 8 will thus lower onto the ground. By then elevating the roller sections 13 and causing the supplemental yoke 11 to swing upwardly, the bolts 18 can be reinserted into the sides of yoke 1 and back of the supplemental yoke 11, as shown in Fig. 1, thus supporting the rollers 13 out of contact with the ground. If desired, however, the supplemental yoke 11 can be entirely removed by removing the bolts 14.

When it is desired to replace the roller sections within the attachment and to shift them to active positions, the supplemental yoke 11 is placed within the yoke 1 and is connected thereto by means of the bolts 14. The bolts 18 are removed, and a block such as shown at C, is placed in front of the roller sections 13. The tractor is then propelled forward and as the roller sections 13 thrust against the stationary block C, it will be seen that the supplemental yoke 11 will be swung upwardly about the shaft 12 as a pivot until it comes to the position shown in Fig. 2 whereupon the bolts 18 can be reinserted and the roller sections 13 thus secured in place. During this movement of the roller sections to active positions, the front end of the tractor is slightly raised so as to lift the wheels 8 out of contact with the ground.

As hereinbefore stated, the attachment herein described can be used in connection with various types of tractors, the said attachment being substituted for the ordinary steering head or yoke commonly employed.

It is to be understood that the strain rod 10 is only to be used when the roller attachment is entirely dispensed with. Before this attachment can be placed in the yoke 1 it is necessary to remove the strain rod 10.

What is claimed is:—

1. An attachment for tractors, including a yoke, supporting wheels connected to the sides thereof, a supplemental yoke detachably and pivotally mounted within said yoke, a roller section movable with the supplemental yoke, and means for locking said supplemental yoke within and against movement relative to the first named yoke and with the roller section projecting below the wheels.

2. An attachment for tractors, including a main yoke, supporting wheels connected thereto, a supplemental yoke detachably and pivotally connected to the main yoke, a roller section journaled within the supplemental yoke, and means for locking said supplemental yoke with the roller section in or out of active position.

3. An attachment for tractors, including a main yoke, supporting wheels connected to the sides thereof, a roller, a movable connection between the roller and the main yoke, means for locking said connection in position within or projecting outwardly from the yoke to hold the roller in or out of active position.

4. An attachment for tractors, including a main yoke, supporting wheels connected thereto, a supplemental yoke, a roller carried by the supplemental yoke, coöperating means upon the main and supplemental yokes for transferring the weight of the main yoke to the supplemental yoke and the roller when said supplemental yoke is housed within the main yoke, means for securing the supplemental yoke in housed position within the main yoke, said means being adapted to hold the supplemental yoke out of housed position with the roller out of contact with the ground.

5. An attachment for tractors, including interfitting pivotally connected yokes, supporting wheels connected to one of the yokes, a roller connected to the other yoke and adapted to extend below the supporting wheels, said roller and its yoke being shiftable out of normal position relative to the other yoke, and means for locking the roller and its yoke in or out of normal position.

6. An attachment for tractors, including interfitting detachably and pivotally connected yokes, supporting wheels connected to one of the yokes, a roller connected to the other yoke, said roller being shiftable into or out of position below the supporting wheels, and means for holding the roller in either of said positions.

In testimony that I claim the foregoing as my own, I have hereto affixed my signature in the presence of two witnesses.

ALPHONSE BAECHLE.

Witnesses:
 MAYME FISHER,
 C. O. FREDERICK.